Dec. 6, 1966     R. C. WESTVEER     3,289,699

VALVED COUPLING

Filed April 18, 1963

*INVENTOR*
ROBERT C. WESTVEER

BY *Dodge and Sons*

ATTORNEYS

United States Patent Office 3,289,699
Patented Dec. 6, 1966

3,289,699
VALVED COUPLING
Robert C. Westveer, Kalamazoo, Mich., assignor to The New York Air Brake Company, a corporation of New Jersey
Filed Apr. 18, 1963, Ser. No. 273,973
6 Claims. (Cl. 137—614.03)

This invention relates to valved pipe couplings. Particularly, it concerns check valve means which are so arranged and located that the space between the valve seats in the mating coupling halves is of minimum size so as to prevent fluid loss when the coupling halves are being disconnected and to prevent the entrainment of air when the coupling halves are being connected together.

The valve means in each coupling half includes two coacting valve members. A first valve member is mounted to reciprocate axially of the coupling half between a first limiting position and a second position, and is biased toward the first position which it assumes when the coupling halves are disconnected. This valve member is moved to second position by engagement with the corresponding valve member of the other coupling half when the coupling halves are connected together. Coacting with the first valve member is a second valve member coaxial with the first and also mounted to reciprocate relatively to the coupling. A rod projects longitudinally from a fixed support in the coupling half outward through an opening in the second valve. A spring reacts between the second valve member and a fixed spring seat carried by the coupling half. When the valve members coact to prevent fluid flow, both valve members are limited in their outward movement; one is in its first limiting position defined above and movement of the other is limited by the coaction between the valve members. Leakage from the flow path between the coupling halves is prevented by a sleeve coaxial with the valve elements and encircling both of them. Inward and outward motion of this sleeve axially of the coupling is limited by appropriate stops. A seal is provided on the radial face at its outer end. This sleeve is biased axially outward, by a spring.

The preferred embodiment of this invention will be described having reference to the accompanying drawing in which FIG. 1 is an elevation partly in axial section of two interconnected coupling halves.

Figure 1:
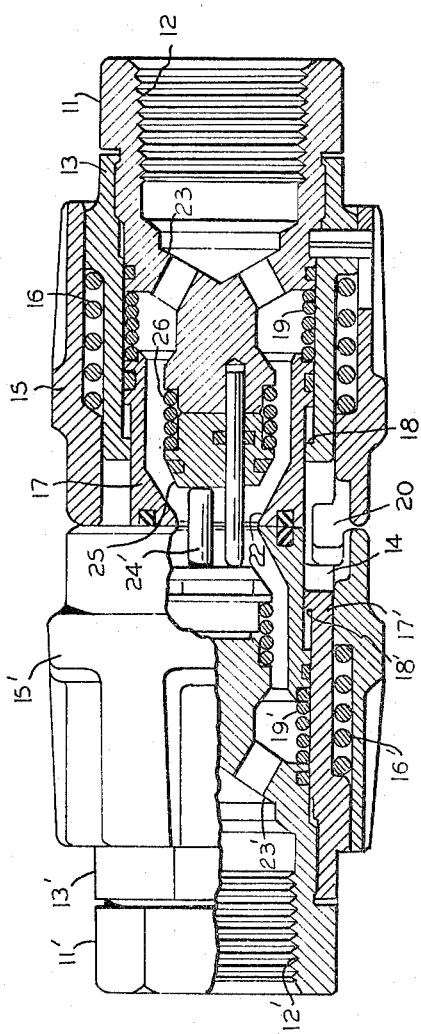

The improved valving arrangement to be described herein is illustrated as it is embodied in the pipe coupling described and claimed in my co-pending application, Serial No. 188,125, filed April 17, 1962, now Patent No. 3,201,-151. It will be apparent, however, that use with other couplings is possible. Since the coupling halves are identical, the corresponding parts bear the same reference numeral except that the parts of the lefthand coupling half (FIG. 1) bear the symbol ′ (prime).

The coupling includes a body 11 have threaded connection 12 by which it may be mounted on one of two pipes to be connected together. Tubular member 13 is connected to body 11 by a threaded connection as shown. Four hooked prongs 14 are formed at the outer end of member 13. The hooks on prongs 14 extend in the same circumferential direction and when the coupling halves are joined, the prongs of the coupling halves are inserted between each other and rotated to engage the hooks of one coupling half behind the hooks on the prongs of the other coupling half. A locking sleeve 15 encircles member 13 and has radially inward directed bosses 20 which react between the unhooked or back faces of the intercalated prongs to hold member 13 against rotation relatively to member 13′ which would disengage the hooks 14, 14′. A spring 16 biases sleeve 15 toward locking position, but permits it to be withdrawn when the coupling halves are to be connected or disconnected. A cylindrical tubular member 17 is reciprocable in the bore of member 13 and is biased outward toward stop 18 by spring 19. An endless seal 21 is set in the radial, outer end face of member 17. The coupling described to this point is shown and claimed in applicant's co-pending application Serial No. 188,125.

Figure 3:
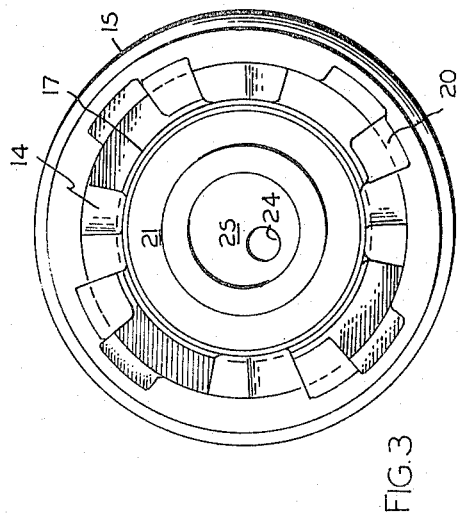
FIG. 3 is an end elevation of one coupling half.

According to the present invention, a frusto-conical valve seat 22 is formed near the outer end of the inner cylindrical surface of member 17. A spider 23 is formed in body 11 and carries a thrust rod 24 which extends longitudinally outward therefrom. As best shown in FIG. 3, the rod 24 is located off-center from the axis of the coupling and is radially so positioned that it cannot meet the rod 24′ of the other coupling half when the coupling halves are being interconnected and so that it will not engage the other rod 24′ when the coupling halves are rotated to engage the hooks of prongs 14 and 14′. A valve member 25 is reciprocable along rod 24 and biased outward by spring 26.

Figure 2:
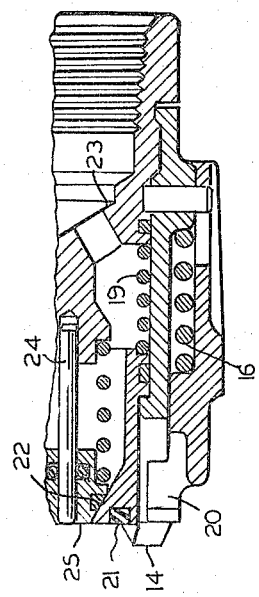
FIG. 2 is a fragmentary axial sectional view of one coupling half.

As shown in FIG. 2, when the coupling halves are disconnected, the valve is closed and the outer end surfaces of sleeve 17, valve 25 and rod 24 lie in a single transverse plane normal to the longitudinal axis of the coupling. The hooked ends of prongs 14 extend slightly beyond the plane. This extension of the prongs 14 will insure relative rotation of the coupling halves to a position in which rods 24 and 24′ cannot meet head on or interfere.

As the coupling halves are brought together, the locking sleeve 15′ will be pushed backward along member 13′ by engagement of hooked prongs 14 with the projecting bosses 20 of the other coupling half. When the prongs are approximately completely inserted, the inclined camming surfaces of the hooks 14 and bosses 20 will rotate the coupling halves to interlocked position, at which time the bosses 20 will no longer be in engagement with the ends of hooked prongs 14, and spring 16 will force locking sleeve 15 forward to a position in which the bosses 20 react between the back faces of the prongs 14 to prevent relative rotation of the coupling halves in the reverse (releasing) direction.

As the coupling halves are being brought together, the ends of sleeves 17 and 17′ engage; valve 25 is engaged by rod 24′ and valve 25′ is engaged by rod 24. When coupling is completely made up, sleeves 17 and 17′ will have moved inward relatively to the coupling halves a distance equal to one-half the inward movement of valves 25 and 25′ so that the flow path through the coupling is open. The face seals 21 and 21′ on the sleeves 17 and 17′ are held together to seal against leakage by springs 19 and 19′. When fluid under pressure flows through the coupling, the pressure at the opposite ends of sleeves 17 and 17′ will urge the seals tightly together.

The coplanar arrangement of the outer end surfaces of sleeve 17, valve 25 and rod 24 when coupling is disconnected, insures against the trapping of air between these surfaces and the corresponding surface of the other coupling when the coupling halves are initially brought together. When the coupling halves are disconnected, the valve 25 will be seated on seat 22 just as the sleeves 17, 17' separate. Hence there will be little or no fluid leakage.

While the preferred embodiment has been described in considerable detail, the invention is not limited to this precise embodiment.

What is claimed is:

1. In a coupling including two mating units, valves effective to permit flow through said coupling when the units are connected together and prevent flow from either unit when they are disconnected comprising
   (a) valve means mounted in each unit for longitudinal movement relatively thereto and each valve means including a longitudinally movable valve seat and a longitudinally movable valve head, said head and seat being movable relatively to each other between an outer closed position and an inner open position;
   (b) said valve means having complementary outer end surfaces which are brought into face to face engagement over the entire area of said surfaces, as said units are brought together;
   (c) sealing means mounted for longitudinal movement in each unit closely encircling the outer end surfaces of said valve means and brought into abutting, sealing contact with one another at the same time as the outer end surfaces of the valve means come into engagement, whereby minimum clearance volume is defined by the engaged sealing means and the engaged end surfaces of the valve means; and
   (d) thrust means carried by each unit and rendered effective as an incident to coupling movement of said units after sealing contact occurs to unseat the valve means in each unit.

2. Valve means for use in mating tubular coupling units comprising
   (a) a sleeve mounted in each coupling unit in fluidtight relation thereto, the sleeve being longitudinally reciprocable between inner and outer limiting positions and biased toward the outer position;
   (b) a seal on the outer end face of each sleeve and arranged to abut the corresponding seal of the other coupling unit when the units are brought together;
   (c) a longitudinally reciprocable generally annular valve element encircled by each sleeve at its outer end;
   (d) a poppet valve element reciprocable longitudinally of each coupling unit between inner and outer positions, said poppet valve element closing against said annular valve member in its outer position;
   (e) means biasing the valve elements outward;
   (f) the poppet valves each being closed against the corresponding annular valve member and abutting one another end to end when the seals on the sleeves are brought together end to end;
   (g) one valve element of one unit having a longitudinal opening extending therethrough, the corresponding valve element of the other unit having a longitudinal opening through it; and
   (h) thrust rods, one extending through each opening in fluidtight relation and reacting between one coupling unit and that valve element in the other unit which has an opening through it, the thrust rods being arranged to move the valve elements inward relatively to said units and relatively to each other as the units are coupled.

3. Valve means for use in mating coupling units comprising
   (a) a rotatable sleeve reciprocable in each coupling unit between limiting positions;
   (b) a seal reacting between the sleeve and the inner surface of the corresponding coupling unit;
   (c) a radial face seal on the outer end of each sleeve;
   (d) means biasing each sleeve toward the outer limiting position;
   (e) a conical valve seat formed on the interior of each sleeve adjacent its outer end;
   (f) a support in each coupling unit;
   (g) an offcenter thrust rod extending longitudinally outward from said support;
   (h) a valve member slidable along said rod in fluidtight relation thereto and biased outward toward said seat;
   (i) the free ends of the rods in each coupling unit engaging the outer face of the valve member of the other coupling unit as the face seals of the two units are engaged and rendered effective to unseat the valve of the other coupling unit by the movement of the sleeves toward their innermost positions; and
   (j) in which in each unit the outer face of the valve member, the end of the thrust rod and the face seal lie in a plane normal to the axis of the coupling when said coupling units are separated.

4. In two mating coupling units the combination of valving means comprising
   (a) two identical valve elements one carried by and longitudinally reciprocable in each coupling unit between inner and outer limiting positions;
   (b) two identical valve members one carried by and longitudinally reciprocable in each coupling unit between inner and outer limiting positions;
   (c) the valve member and valve element carried by each unit being coaxial and longitudinally movable relatively to one another between open and closed positions according as the coupling units are being connected or disconnected;
   (d) means biasing the valve member and valve element outward of the coupling in which they are carried;
   (e) the outer ends of said valve elements coming into face to face abutment with one another and each moved inward longitudinally relatively to the coupling unit by which it is carried during connecting of said units;
   (f) thrust means reacting between each coupling unit and the valve member of the other unit, during engaging movement of the coupling units, whereby each valve member is moved inward relatively to the coupling unit by which it is carried during engagement of said units; and
   (g) in which the valve elements come into abutment at the same time that the thrust reaction occurs; and
   (h) a sealing means in each unit encircling the valve element and valve member of that unit and effective to form a seal between said units just as said valve elements come into abutment.

5. The combination defined in claim 4 and
   (a) either the valve element or the valve member including a sleeve reciprocable in and carried by the corresponding coupling unit and encircling the other of said valve member or valve element carried by that unit, said sleeve being in fluidtight relation with the outer surface of the valving means;
   (b) means limiting outward movement of said sleeve;
   (c) in which said sealing means is an endless seal mounted in the radial, outer end face of each sleeve;
   (d) the seals of the sleeves abutting each other and causing motion of each sleeve into the coupling unit by which it is carried during connecting of said units.

6. A valve arrangement for a conduit coupling having two mating coupling halves, permitting flow through said coupling when the halves are interconnected and preventing flow from each half when they are disconnected, comprising identical valve means in each coupling half, each valve means including a longitudinally movable valve seat and a longitudinally movable valve head; longitudinally movable sealing means reciprocably mounted in each coupling half and closely encircling the valve means, the sealing means and the valve means in the closed position having outer end surfaces which define a surface extending transversely of the flow path through the coupling, the transverse surface of one coupling half being co-extensive with and complementary to the transverse surface of the other coupling half, a thrust element mounted stationarily in each coupling half and extending longitudinally outward through an opening in one of the valve elements, the outer end of the thrust element lying in said transverse surface when the valve means is closed.

References Cited by the Examiner

UNITED STATES PATENTS

| Re. 8,337 | 7/1873 | Gardner et al. | 137—614.04 |
|---|---|---|---|
| 165,415 | 7/1875 | Henderson | 137—614.04 |
| 823,510 | 6/1906 | Christensen | 137—614.04 |
| 882,017 | 3/1908 | Pulliam | 137—614.04 X |
| 1,818,124 | 8/1931 | Engbrecht | 137—614.05 |
| 3,168,906 | 2/1965 | Brown | 137—614 X |

FOREIGN PATENTS 823,372  12/1951  Germany.

WILLIAM F. O'DEA, *Primary Examiner.*

ISADOR WEIL, *Examiner.*

J. O'NEILL, A. COHAN, *Assistant Examiners.*